United States Patent [19]

Goldner

[11] Patent Number: 5,508,059
[45] Date of Patent: Apr. 16, 1996

[54] FLAVOR EMULSIONS AND BEVERAGES CONTAINING LEUCAENA GUM

[75] Inventor: William R. Goldner, Langhorne, Pa.

[73] Assignee: Bush Boake Allen Inc., Montvale, N.J.

[21] Appl. No.: 372,630

[22] Filed: Jan. 13, 1995

[51] Int. Cl.$^6$ ..................................... A23L 1/222
[52] U.S. Cl. .................. 426/650; 426/573; 426/575; 426/590; 426/651
[58] Field of Search ....................... 426/590, 651, 426/650, 573, 575

[56] References Cited

U.S. PATENT DOCUMENTS

| | | | |
|---|---|---|---|
| 1,526,746 | 2/1925 | Friedman . | |
| 3,652,291 | 3/1972 | Bedoukian | 426/651 |
| 3,764,346 | 10/1973 | Noznick et al. | 426/651 |
| 4,000,318 | 12/1976 | Ferguson et al. | 426/2 |
| 5,133,979 | 7/1992 | Clarke et al. | 426/49 |
| 5,296,245 | 3/1994 | Clarke et al. | 426/49 |
| 5,332,595 | 7/1994 | Gaonkar | 426/651 |

OTHER PUBLICATIONS

Anderson et al., 1988. Bulletin of the Japanese Society of Scientific Fisheries, vol. 2(3) 247–253.
D. M. W. Anderson et al, *Int. Tree Crops Journal*, vol. 2, pp. 291–295 (1983).
D. M. W. Anderson, "Gum Exudation by Leucaena Leucocephala", pp. 108–109.
D. M. W. Anderson, "The Amino Acids in Gum Exudates––Possible Indicators of Drought Resistance Factors".
D. M. W. Anderson et al, *Food Hydrocolloids*, vol. 2, No. 3, pp. 247–253 (1988).
D. M. W. Anderson, *NFT Highlights*, May 1989.
D. M. W. Anderson, *Leucaena Research Reports*, vol. 9, pp. 95–96 (Sep. 1988).
L. G. Enriquez et al, *Plant and Microbial Food Gums*, pp. 335–416 (1989).
Anupam Agrawal et al, *Indian Forester*, pp. 505–516, (Jul. 1985).
Sujan Singh et al., *Indian Forester*, vol. 109, No. 4, pp. 185–192 (Apr. 1983).
James L. Brewbaker et al., "New Tree Crops From Interspecific Leucaena Hybrids", pp. 283–289.
S. K. Arora et al., *Starch*, vol. 37, No. 4, pp. 109–111 (1985).
NFTA Staff, NFT Highlights, May 1990.
D. K. Raval et al., *Starch*, vol. 40, No. 6, pp. 214–218, (1988).
P. L. Soni et al., *Cellulose Chem. Technol.*, vol. 18, pp. 625–629 (1984).

*Primary Examiner*—Helen Pratt
*Attorney, Agent, or Firm*—Beth Kovitz Fields; Charles A. Gaglia, Jr.; Wendy A. Choi

[57] ABSTRACT

Flavor emulsions prepared by encapsulating a flavoring agent in leucaena gum are disclosed. The flavor emulsions can be used to prepare beverages in accordance with the invention.

9 Claims, No Drawings

_5,508,059_

FLAVOR EMULSIONS AND BEVERAGES CONTAINING LEUCAENA GUM

FIELD OF THE INVENTION

The present invention is generally related to flavor emulsions and beverages containing Leucaena gum.

BACKGROUND OF THE INVENTION

Many flavoring agents used in beverage preparation are essential oils or oleoresins, which are generally water-insoluble. However, flavors that are used in commercial beverages must be water-soluble or dispersible. Accordingly, carbohydrate gums are commonly employed to form flavor emulsions and these flavor emulsions are used to flavor a beverage.

All emulsions separate at a predetermined rate. The rate at which an emulsion separates is dependent upon, among other things, the difference in density between the oil and water phases; viscosity of the aqueous phase; and the size of the emulsion particles. The slower the rate of separation, the more stable the emulsion.

Useful flavor emulsions must be stable per se, i.e. in the emulsion, as well as stable in the beverage in which the emulsion is used. The stability of a flavor emulsion is largely dependent on the gum used to form the emulsion.

There are many known carbohydrate gums. Such gums may be natural or modified and include seaweed extracts such as agar, algins, and carrageenans; plant seed gums such as locust bean gum and guar gum; polysaccharide gums such as xanthan gum; plant exudates such as gum arabic, gum tragacanth, and gum karaya; and, synthetic gums such as sodium carboxymethylcellulose, hydroxypropylmethylcellulose, methylcellulose, and microcrystalline cellulose.

Of these gums, gum arabic is superior to all others and is the standard by which all other gums are measured. Gum arabic functions as an effective surfactant to keep the emulsion particles small and provides viscosity to the aqueous phase of the emulsion so that the difference in density between the oil and water phases is minimized.

True gum arabic is produced by *Acacia senegal*, a shrub native to the arid sub-Sahelian regions of Africa and the Middle East. Commercial production of gum arabic requires that these shrubs be exposed to severe physiological stress in the form of water depletion and heat. Gum formation permits the shrubs to store a hydrophilic form of reserve carbohydrate in response to this stress.

Despite the strong drought resistance mechanism that results in the formation of gum arabic, two droughts in the past twenty years have killed many trees and decreased production. In addition, political turmoil in the regions where *Acacia senegal* is grown has further exacerbated the shortage.

Accordingly, it would be desirable to provide a carbohydrate gum having emulsification properties equivalent to those of gum arabic.

SUMMARY OF THE INVENTION

The present invention is generally related to flavor emulsions and beverages containing Leucaena gum. Leucaena gum can be used to encapsulate flavoring agents and provide flavor emulsions. Beverages can be prepared using these flavor emulsions.

DETAILED DESCRIPTION OF THE INVENTION

The present invention is directed to flavor emulsions and beverages wherein a flavoring agent is encapsulated by gum obtained from the stems of Leucaena plants. As used herein, the term "flavoring agent" is broadly defined and includes, without limitation, essential oils, oleo resins, juices, solids extracts, and other materials such as artificial flavors.

Essential oils are volatile oils that are obtained from plants. They can be obtained, for example, by steam distillation, pressing, or extraction with suitable solvents. Most essential oils are mixtures of hydrocarbons such as terpenes and sesquiterpenes, oxygenated compounds, and small amounts of non-volatile solids. The oxygenated compounds are the principal flavor bodies.

Oleoresins are similar to essential oils but contain much more of the characteristic flavor of an herb. For example, most of the characteristic flavor, but none of the pungency of ginger is present in the essential oil. An oleoresin must be used to obtain a full ginger flavor. Popular oleoresins include, but are not limited to, ginger, black pepper, capsicum, paprika, celery, and vanilla.

Fruit and berry juices are also widely used as flavoring agents. Juices are generally used in concentrated form by removing water under vacuum so that the final flavoring agent has a strength that is up to about 6 times the strength of the original juice.

Exemplary flavors that can be provided using flavoring agents include, without limitation, birch beer, cherry, cola, cream, ginger, grape, grapefruit, lemon, lime, orange, raspberry, root beer, strawberry, vanilla, and the like. Of course, it is also understood that any two or more flavoring agents can be combined to provide additional flavors.

As used herein, the term "gum" is used in a broad sense to refer to a mucilaginous plant excretion. Gums are generally complex carbohydrates that yield sugars on hydrolysis. The type of gums that are useful in preparing flavor emulsions and beverages in accordance with the present invention dissolve or swell in water and are substantially insoluble in alcohol. In particular, it has now been discovered that Leucaena gum has good emulsification properties and is useful for preparing flavor emulsions and beverages containing these flavor emulsions.

As used herein, "Leucaena gum" means gum produced from the stems of plants of the Leucaena family. Plants of the Leucaena family include, but are not limited to, *Leucaena leucocephala, Leucaena esculenta, Leucaena collinsii, Leucaena diversifolia, Leucaena greggi, Leucaena lanceolata, Leucaena macrophylla, Leucaena pallida, Leucaena pulverulenta, Leucaena retusa, Leucaena salvadorensis, Leucaena shannoni, Leucaena trichodes* and hybrids thereof.

In particular, hybrid trees of *Leucaena leucocephalia* with *Leucaena esculenta* produce gum that appears as balls or drippings from mature bark. Gum production is heaviest in the dry season and can exceed the mean annual per-tree gum production of about 250 g/tree that is typical of gum arabic production by *Acacia senegal*.

Leucaena gum can be used alone or in combination with other gums to encapsulate a flavoring agent. Other gums that can be used include, but are not limited to, agar, algin, carrageenan, locust bean gum, guar gum, xanthan gum, gum arabic, gum tragacanth, gum karaya, sodium carboxymethylcellulose, hydroxypropylmethylcellulose, methylcellulose, microcrystalline cellulose, and mixtures thereof.

The gum may be used in a gummy state, which is the form in which natural gums are generally collected. Alternately, the gum may be cleaned and dried prior to use. This can be accomplished, for example, by dissolving the gum in water to form a mucilage and spray drying the mucilage. To further purify the gum, the mucilage can be pasteurized and/or filtered prior to spray drying.

The following example is presented for purposes of illustration only and is not to be construed in a limiting sense.

EXAMPLE 1

Eighty (80) grams of leucaena gum obtained from hybrids of *Leucaena leucocephala* with *Leucaena esculenta* were dissolved in 280 ml water to form a mucilage. The mucilage was pasteurized, filtered, and spray dried at an inlet temperature of 190° C. and an outlet temperature of 90° C. The spray drying was successful and no difficulties due to viscosity or moisture retention, which would have caused the gum to stick to the walls of the spray dryer, were apparent. A dry gum of uniform texture and quality was obtained.

Flavor emulsions can be prepared, for example, by thoroughly mixing a flavoring agent with an emulsifying agent including Leucaena gum and adding water until a desired consistency is achieved. In order to keep the emulsion homogeneous, viscosity and specific gravity are regulated so that they are compatible with the characteristics of the flavoring agent and the emulsifying agent and techniques for accomplishing this objective are well known to those skilled in the art.

The amount of Leucaena gum used is an amount effective to encapsulate at least a portion of the flavoring agent and therefore, will vary with the amount of flavoring agent. In general, the flavor emulsion will include between about 5% to 30% by weight flavoring agent, preferably between about 10% and 20% by weight.

The following non-limiting Examples 2–5 demonstrate preparation of flavor emulsions.

EXAMPLE 2

Four hundred and fifty (450.0) grams leucaena gum obtained from stems of hybrids of *Leucaena leucocephala* with *Leucaena esculenta* were added to 1600.0 ml water and heated at 80° C. with stirring to produce a mucilage. The mucilage was filtered through a fine nylon mesh filter to remove extraneous material, mainly fiber and small pieces of wood. The resulting mucilage was heated at 90° C. for 15 minutes to pasteurize the mucilage and form a final mucilage product containing 20% wt/vol final solids content based on a simple loss of water on drying method.

Forty (40) ml Orange Oil Sweet Brazilian, was added to 1000 ml of the pasteurized mucilage under stirring with a Ystral High Shear Stirrer at 75,000 rpm for 5 minutes. It was calculated that 1000 ml of mucilage contained 200 grams of Leucaena gum. Accordingly, a flavor emulsion was provided in accordance with the invention.

EXAMPLE 3

The flavor emulsion prepared in accordance with Example 2 was spray dried using an ARV Anhydro Lab Spray Drier (Model No. 3.52.50.01) at an inlet temperature of 190° C. and an outlet temperature of 90° C. The flavor emulsion spray dried without any problems.

EXAMPLE 4

(for comparison)

Two hundred (200) grams of spray dried gum acacia was dissolved in 875.0 ml water using a Ystral Turbo Mixer attachment to make 1000 ml mucilage having 20% wt/vol solids content. Forty (40.0) ml Orange Oil Sweet Brazilian was added to the 1000 ml mucilage to prepare a gum acacia flavor emulsion in the manner described in Example 2, and the gum acacia flavor emulsion was spray dried as described in Example 3.

EXAMPLE 5

A blended mucilage was produced by mixing 50 parts by weight flavor emulsion of Example 2 and 50 parts by weight gum acacia flavor emulsion of Comparative Example 4. The blended mucilage was spray dried as described in Example 3.

The following non-limiting Example 6 compares the extent of encapsulation of the flavor emulsions produced in Examples 3, 4, and 5.

EXAMPLE 6

The spray dried flavor emulsions produced in Examples 3, 4, and 5 were tested to determine the extent of encapsulation by measuring the degree of oxidation of the flavoring agent.

Each of the three samples was packed in a clear, flat plastic box to expose a large surface area to light. Each box was subjected to identical amounts of normal daylight and ultraviolet (UV) light. In particular, each box was subjected to 16 hours of UV light and 8 hours of normal daylight during each 24 hour period. UV light was supplied by a Heraeus Novasoltest UV light cabinet set to irradiate the boxes in the spectral range of from about 300 to 800 nm, which is the typical intensity of midday sunshine in the state of Florida.

The samples were checked at the end of each 24 hour period to determine the presence of an aroma. The presence of an aroma is indicative of oxidation of the flavoring agent. The results are shown in Table 1.

TABLE 1

| TIME | OBSERVATIONS |
|---|---|
| 24 hrs. | little change in aroma |
| 48 hrs. | all samples were beginning to show detectable oxidized notes |
| 96 hrs. | all samples showed extensive oxidation, although the gum acacia flavor emulsions of comparative Example 4 exhibited greater oxidation then the leucaena gum flavor emulsion of Example 3 |
| 120 hrs. | results were comparable to those exhibited at 96 hrs. |
| 148 hrs. | all samples were completely oxidized |

Control samples of each flavor emulsion were maintained in darkness. The control samples showed no signs of oxidation.

As shown in Table 1, the samples of flavorant were sufficiently encapsulated with Leucaena gum to resist significant oxidation for at least 48 hours; this compares favorably with the performance of gum arabic.

Beverages can be prepared using the flavor emulsions provided in accordance with the invention. As used herein, the term "beverage" is used in a broad sense to refer to a drinkable liquid, including a flavor emulsion of the type provided in accordance with the invention and water. The beverage may be carbonated or non-carbonated.

Other components are also optionally incorporated in the beverage. Such components include, for example and without limitation, sweeteners, acids, other flavoring agents, colors, preservations, and the like. Of course, all of the components of the beverage must be generally recognized as safe (GRAS) for use in beverages.

I claim:

1. A flavor emulsion comprising:
   (a) at least one flavoring agent; and
   (b) an effective amount of an emulsifying agent including leucaena gum in an amount sufficient to encapsulate at least a portion of the flavoring agent.

2. The flavor emulsion of claim 1 wherein the at least one flavoring agent is selected from the group consisting of essential oils, oleoresins, juices, solids extracts, artificial flavors, and mixtures thereof.

3. The flavor emulsion of claim 1 wherein the leucaena gum is obtained from a hybrid of *Leucaena leucocephala* with *Leucaena esculenta*.

4. The flavor emulsion of claim 1 wherein the leucaena gum is used in combination with a gum selected from the group consisting of agar, algin, carrageenan, locust bean gum, guar gum, xanthan gum, gum arabic, gum tragacanth, gum karaya, sodium carboxymethylcellulose, hydroxypropylmethylcellulose, methylcellulose, microcrystalline cellulose, and mixtures thereof.

5. The flavor emulsion of claim 1 wherein the leucaena gum is cleaned and dried prior to being used to form the flavor emulsion.

6. A beverage comprising:
   water; and, at least one flavor emulsion including a flavoring agent and leucaena gum in an amount sufficient to encapsulate at least a substantial portion of the flavoring agent.

7. The beverage of claim 6 wherein the leucaena gum is obtained from a hybrid of *Leucaena leucocephala* with *Leucaena esculenta*.

8. The beverage of claim 6 wherein the leucaena gum is used in combination with a gum selected from the group consisting of agar, algin, carrageenan, locust bean gum, guar gum, xanthan gum, gum arabic, gum tragacanth, gum karaya, sodium carboxymethylcellulose, hydroxypropylmethylcellulose, methylcellulose, microcrystalline cellulose, and mixtures thereof.

9. The beverage of claim 6 further including a component selected from the group consisting of sweeteners, acids, flavoring agents, colors, preservatives, and mixtures thereof.

* * * * *